United States Patent [19]

König et al.

[11] 4,334,046

[45] Jun. 8, 1982

[54] PRODUCTION OF COPOLYMERS OF ACRYLONITRILE AND VINYL CHLORIDE

[75] Inventors: Joachim König, Berg.-Gladbach; Carlhans Süling, Odenthal, both of Fed. Rep. of Germany

[73] Assignee: Bayer Aktiengesellschaft, Leverkusen, Fed. Rep. of Germany

[21] Appl. No.: 95,724

[22] Filed: Nov. 19, 1979

Related U.S. Application Data

[63] Continuation of Ser. No. 868,728, Jan. 11, 1978, abandoned.

[30] Foreign Application Priority Data

Jan. 19, 1977 [DE] Fed. Rep. of Germany ....... 2702053

[51] Int. Cl.$^3$ ...................... C08F 2/30; C08F 222/30; C08F 2/26
[52] U.S. Cl. ........................................ 526/93; 526/342
[58] Field of Search .................................... 526/93, 94

[56] References Cited

U.S. PATENT DOCUMENTS

| | | | |
|---|---|---|---|
| 3,135,722 | 6/1964 | Logemann | 526/93 |
| 3,193,537 | 7/1964 | Dinges | 526/329.3 X |
| 4,100,339 | 7/1978 | König | 526/342 X |
| 4,118,556 | 10/1978 | König | 526/342 X |

*Primary Examiner*—C. A. Henderson
*Attorney, Agent, or Firm*—Sprung, Horn, Kramer & Woods

[57] ABSTRACT

The invention relates to a process for the production of a chemically uniform acrylonitrile vinyl chloride copolymer in an aqueous emulsion in the presence of a redox catalyst and with a fluctuating concentration of at least one iron salt in the reaction medium wherein the polymerization reaction is carried out at a pH value of from 2 to 6 in the presence of a mixture of an iron salt and a complex former, the complex former having certain apparent stability constants of the iron-II-complex and of the iron-III-complex.

7 Claims, No Drawings

PRODUCTION OF COPOLYMERS OF ACRYLONITRILE AND VINYL CHLORIDE

This is a continuation, of application Ser. No. 868,728, filed Jan. 11, 1978 now abandoned.

BACKGROUND OF THE INVENTION

1. Field of the Invention

This invention relates to a process for the production of copolymers of acrylonitrile and vinyl chloride in aqueous emulsion.

Copolymers of acrylonitrile and vinyl chloride are suitable for the production of filaments and fibres. In addition to the favourable properties normally encountered, fibres of these copolymers—by virtue of their chlorine content—are substantially non-inflammable and highly flameproof, which makes them eminently suitable for use in the production of wigs, woven imitation furs, children's clothing, carpeting, decorative materials, curtaining and the like.

2. Discussion of Prior Art

It is known that acrylonitrile-vinyl chloride copolymers can be produced by emulsion polymerisation, the polymerisation reaction normally being carried out in the presence of a large excess of vinyl chloride. Chemically uniform copolymers suitable for use as fibre material are only formed by maintaining a defined ratio between the two monomers, acrylonitrile and vinyl chloride, in the monomer mixture throughout the entire polymerisation reaction. The entire quantity of vinyl chloride is normally added at the beginning of polymerisation or is replenished during the reaction. The required monomer ratio is adjusted by controlled addition of the more quickly polymerising acrylonitrile.

In cases where they are used as starting materials for fibres, the polymers have to satisfy stringent requirements in regard to their chemical uniformity. Accordingly, the requisite monomer ratio has to be adjusted very accurately and kept constant during the polymerisation reaction.

The copolymerisation of acrylonitrile and vinyl chloride in aqueous emulsion is initiated by water-soluble redox catalysts, particularly those based on soluble compounds of tetravalent and hexavalent sulphur, the redox system peroxodisulphate/bisulphite being particularly suitable. In addition, it is advantageous to work at relatively low polymerisation temperatures in order to obtain polymers having an adequate molecular weight and satisfactory colour properties.

Various publications (for example Faserforschung und Textiltechnik 14 (1963), page 517; Makromolekulare Chemie 128 (1969) page 83) have shown that the redox system peroxodisulphate/bisulphite requires a low heavy-metal concentration at temperatures of about 25° C. The following reactions take place:

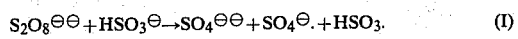

$$S_2O_8^{\ominus\ominus} + HSO_3^{\ominus} \rightarrow SO_4^{\ominus\ominus} + SO_4^{\ominus\cdot} + HSO_3\cdot \quad (I)$$

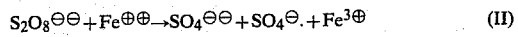

$$S_2O_8^{\ominus\ominus} + Fe^{\oplus\oplus} \rightarrow SO_4^{\ominus\ominus} + SO_4^{\ominus\cdot} + Fe^{3\oplus} \quad (II)$$

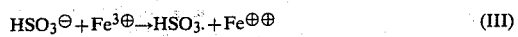

$$HSO_3^{\ominus} + Fe^{3\oplus} \rightarrow HSO_3\cdot + Fe^{\oplus\oplus} \quad (III)$$

Reaction (I) between peroxodisulphate and bisulphite, which is accompanied by radical formation, takes place at an extremely low reaction velocity in the complete absence of heavy metal ions at a temperature of 25° C. so that polymerisation cannot be initiated by the starter radicals which result from this reaction. By contrast, in the presence of adequate concentrations of heavy metal ions, generally iron ions, reactions (II) and (III) take place at an adequate velocity, even at low temperatures, with formation of starter radicals, so that technically useful conversions are produced in the polymerisation reaction.

In some cases, the quantities of iron ions which are introduced into the reaction medium by commercially manufactured chemicals are sufficient to produce the required quantity of starter radicals by transferring electrons from the reduction component to the oxidation component (reactions II and III). In other cases, the necessary quantity of iron ions has to be purposefully added to the reaction medium.

Fluctuating concentrations of iron ions give rise to different concentrations of the starter radicals available and hence affect the polymerisation velocity. Accordingly, in the case of monomers having comparatively large copolymerisation parameters, fluctuations in the molecular weight of the copolymers are inevitable. In the course of a continuous or semicontinuous polymerisation process for comonomers showing very different monomer reactivities, as are formed for example in the copolymerisation of acrylonitrile and vinyl chloride, the rates at which the monomers are incorporated also vary. In other words, variations in the chemical composition of the copolymers and an increase in the chemical distribution are inevitable. If, for example during the continuous or semicontinuous copolymerisation of acrylonitrile and vinyl chloride, the rate at which the acrylonitrile is added is kept constant for a modified polymerisation velocity, a shift in the monomer composition occurs during the polymerisation reaction and a copolymer having a varying chemical composition coupled with increased chemical inconsistency is obtained.

In order to be able to obtain constant conversion rates which provide for a constant addition programme for the acrylonitrile in the continuous and semi-continuous polymerisation process, it is essential to adjust a constant, relatively low concentration of iron ions during the polymerisation reaction. However, in cases where the continuous or semi-continuous copolymerisation of acrylonitrile and vinyl chloride is carried out on a commercial scale, fluctuating concentrations of iron ions in the reaction medium will produce fluctuating concentrations of the effective starter radicals.

In the production of copolymers containing more than 80% by weight of copolymerised acrylonitrile, the influence of the concentration of iron ions upon the chemical distribution of the copolymers plays only a secondary role. In cases such as these, the copolymerisation reaction is not based upon the presence of a comonomer in a multiple molar excess relative to acrylonitrile in the polymerisation medium. Instead, comparable concentrations of both monomers or an excess of acrylonitrile is used. If, for example, the reaction of acrylonitrile and vinyl chloride is carried out in such a way that copolymers containing more than 80% of copolymerised acrylonitrile are obtained, the progress of the copolymerisation reaction is controlled by the activity of the acrylonitrile. Although the concentration of heavy metal ions significantly influences the polymerisation velocity, it does not affect the rates at which the individual monomers are incorporated into the polymer chains of the macromolecules and, accordingly, also has no influence upon the chemical consistency of the copolymers obtained.

However, a large molar excess of vinyl chloride is necessary when acrylonitrile and vinyl chloride are reacted to form copolymers containing substantially equal quantities by weight of acrylonitrile and vinyl chloride. In a polymerisation process such as this, the concentration of iron ions influences not only the polymerisation velocity, i.e. the volume-time yield in a reactor, but also the chemical composition and the chemical consistency of the copolymers.

However, heavy metal ions not only act as components of starter systems in the redox activation of the radically initiated copolymerisation reaction, but also affect the quality of the reaction products, even when present in very small quantities. It is known, for example, that iron ions adversely affect the product quality of polymers. In the case of polyvinyl chloride, iron ions, even in small quantities, increase the elimination of hydrogen chloride and reduce both colour and thermal stability (Journal of Polymer Science 12 (1954), 543; Kunststoffe 52 (1962), 398). The harmful effect of iron ions present in the reaction medium during the polymerisation reaction on the product properties of polyacrylonitrile or copolymers containing more than 80% of acrylonitrile is also known and is reflected in a reduced thermal stability and in yellowing of fibres spun therefrom (German Auslegeschrift No. 1,040,242).

In order to eliminate the harmful effect of iron ions upon product quality, processes have been developed for carrying out a polymerisation reaction in the presence of strong complex formers such as, for example, ethylene diamine tetraacetic acid or polyphosphoric acids. In the presence of these complex formers, a distinct improvement in the colour and thermal stability of the polymers was obtained, for example in precipitation polymerisation for the production of polymers containing more than 80% of acrylonitrile.

However, these complex formers influence the polymerisation velocity to a very considerable extent and, when used in a molar excess relative to iron ions, even act as stoppers by excessively reducing the effective concentration of iron ions and hence bringing the polymerisation reaction to a complete standstill. Thus, it is pointed out in U.S. Pat. No. 3,843,749 that, even in low concentrations of 10 ppm, ethylene diamine tetraacetic acid is capable of inhibiting the polymerisation of acrylonitrile with the redox system peroxodisulphate/-bisulphite. If, on the other hand, these complex formers are used in a molar deficit relative to iron ions, they are unable to eliminate the harmful effect of the iron, with the result that the polymers are again left with reduced whiteness and diminished thermal stability.

Accordingly, the concentration of these complex formers in the aqueous phase has to be adjusted to a defined, very low value in order both to obtain adequate polymerisation velocities and also to guarantee high thermal stability. However, fluctuations in the polymerisation velocity cannot be avoided with these complex formers unless the concentration of iron ions in the aqueous phase can be kept constant. As already described, these fluctuations in the polymerisation velocity play a secondary role in the production of polymers containing more than 80% of acrylonitrile or in the copolymerisation of monomers showing comparable monomer reactivities, so that polymers of good product quality can be obtained in cases such as these.

These complex formers are not suitable for controlling the copolymerisation of acrylonitrile and vinyl chloride. In this case, fluctuating concentrations of iron ions, such as can occur in industrial polymerisation processes, not only cause fluctuating polymerisation velocities, but also alter the chemical composition and increase the chemical inconsistency of the polymers. Accordingly, even in the presence of these complex formers, fluctuating quantities of iron can make the copolymer unsuitable for use in the fibre sector.

SUMMARY OF THE INVENTION

It has now been found that acrylonitrile-vinyl chloride copolymers which contain from 30 to 60% by weight of acrylonitrile, from 70 to 40% by weight of vinyl chloride and, optionally, up to 15% by weight of other vinyl monomers can be obtained by a semi-continuous or continuous emulsion polymerisation process at a constant polymerisation velocity and despite fluctuating concentrations of iron ions in the reaction medium, providing the polymerisation reaction is carried out at a pH-value of from 2 to 6 in the presence of a mixture of an iron salt and a complex former, the complex former having certain apparent stability constants of the iron(II)complex and the iron(III)complex.

DESCRIPTION OF SPECIFIC EMBODIMENTS

Accordingly, the invention provides a semi-continuous or continuous process for the production of chemically uniform acrylonitrile-vinyl chloride copolymers which contain from 30 to 60% by weight of acrylonitrile, from 70 to 40% by weight of vinyl chloride and, optionally, up to 15% by weight of other vinyl monomers in aqueous emulsion using redox catalysts of peroxodisulphates and water-soluble compounds of tetravalent sulphur at a constant polymerisation velocity and with fluctuating concentrations of iron ions in the reaction medium, wherein the polymerisation reaction is carried out at a pH-value of from 2 to 6 in the presence of a mixture of an iron salt and a complex former, the complex former having apparent stability constants of the iron(II)complex of $K=10^\circ-10^4$ and of the iron(III)complex of $K=10^6-10^{12}$.

The process according to the invention is preferably used for the production of chemically uniform copolymers of 30 to 60% by weight of acrylonitrile and 70 to 40% by weight of vinyl chloride. In addition, the copolymers may contain up to 15% by weight of other copolymerisable ethylenically unsaturated compounds, a range of from 0 to 6% by weight being preferred. Suitable comonomers are, for example, vinylidene chloride, vinyl bromide, styrene, vinyl pyridine, vinyl esters such as vinyl acetate, acrylic acid esters, methacrylic acid esters, acrylic acid amide, methacrylic acid amide and also mono- and di-alkyl derivatives of these amides. Other suitable copolymerisable compounds are ionic additives containing acid groups which are intended to improve the dyeability of the filaments and fibres, for example styrene sulphonic acid, allyl sulphonic acid, methallyl sulphonic acid, 2-acrylamido-2-methyl propane sulphonic acid, acryloxy propyl sulphonic acid, methacryloxy propyl sulphonic acid and salts of these sulphonic acids.

The polymerisation process according to the invention may be carried out semi-continuously or continuously. In the semi-continuous process, the entire quantity of vinyl chloride is introduced at the beginning of the polymerisation reaction and the more quickly reacting acrylonitrile is continuously added at a rate commensurate with its consumption. The polymerisation reaction is terminated on reaching the required polymer content. The polymerised fraction of the monomeric vinyl chloride may, of course, be replenished during polymerisation in order to keep the monomer ratio constant according to the required polymer composition. The catalyst, activator, acid, iron salt, complex former, emulsifier and the comonomer optionally used may either be completely introduced before the beginning of polymerisation or may even be subsequently added, either completely or in part, during the polymerisation reaction.

In the continuous process, a ratio by weight of acrylonitrile to vinyl chloride usually of from 0.02 to 0.5 is adjusted in the monomer mixture added, being selected in such a way that the stationary composition of the monomer mixture corresponds to the required composition of the copolymer, and the copolymers obtained contain from 30 to 60% by weight of acrylonitrile, from 70 to 40% by weight of vinyl chloride and, optionally, up to 15% by weight of other vinyl monomers.

In the process according to the invention, redox systems of water-soluble compounds of tetravalent sulphur and peroxodisulphates are used for initiating the polymerisation reaction. Preferred reducing components are salts of semiesters of sulphurous acid, alkali metal sulphites, alkali metal disulphites, alkali metal hydrogen sulphites, formaldehyde sulphoxylates or sulphur dioxide. Peroxodisulphates, such as alkali metal or ammonium peroxodisulphate, are used as the oxidising component. The redox catalysts are preferably used in a total concentration of from 0.5 to 4.0% by weight, based on the total monomer. The molar ratio of reducing to oxidising component is preferably in the range of from 8:1 to 100:1.

The process according to the invention is carried out in aqueous emulsion at a pH-value in the range of from 2 to 6 and preferably in the range of from 2.5 to 4.0. The required pH-value may be adjusted by the addition of a buffer system or an acid. The acid used may be any strong or medium-strength inorganic or organic acid which is stable in the presence of the redox system. Acids such as sulphuric acid, nitric acid, phosphoric acid or acetic acid are preferably used.

The process according to the invention is carried out in the presence of a mixture of an iron salt and a complex former for iron ions, the complex former having apparent stability constants of the iron(II)complex of $K=10^{\circ}-10^{4}$ and of the iron(III)complex of $K=10^{6}-10^{12}$. The apparent stability constants of the iron complexes are known to be dependent upon pH and may be calculated from the stability constants quoted in the literature (for example J. Bjerrum, Stability Constants of Metal-Ion Complexes, Part I: Organic Ligands, The Chemical Society, London 1957). The calculation of these apparent stability constants is described, for example, in I. M. Kolthoff, Treatise on Analytical Chemistry, Part I, Vol. 1, The Interscience Encyclopedia, New York, 1959, page 562 and in G. Schwarzenbach, Die Komplexometrische Titration, F. Enke-Verlag, Stuttgart, 1955, page 8.

The iron salt used may be any iron(II) or iron(III)salt which, under the polymerisation conditions, is soluble in the polymerisation medium in the presence of the complex former, for example iron(II) or iron(III)sulphate, iron(II) or iron(III)chloride, iron(II) or iron(III)nitrate and also double salts, such as iron(II) or iron(III)ammonium sulphate. Mixtures of iron salts may of course also be used.

The iron salts are generally used in a total concentration of from $10^{-6}$ to $5.10^{-5}$ mole/l. Total iron concentrations of from $10^{-5}$ to $3.10^{-4}$ mole/l are preferred. If an adequate quantity of iron ions is introduced by the chemicals used or by corroding parts of the apparatus, the quantity of iron salt added may be reduced or the addition of an iron salt may be dispensed with altogether.

In the context of the invention, complex formers are molecules or ions which are able to bind a central metal cation by co-ordination with two or more electron pairs and thus to form internal complex salts. Suitable complex formers are water-soluble aliphatic, cycloaliphatic and aromatic polycarboxylic acids and aminopolycarboxylic acids which are stable under the polymerisation conditions and of which the iron complexes have the suitable stability constants and are soluble in the reaction medium. Examples of suitable polycarboxylic acids are oxalic acid, malonic acid and citric acid. Suitable aminopolycarboxylic acids are, for example, aspartic acid, glutamic acid, ethylene diamine-N,N-diacetic acid, ethylene diamine-N,N'-dipropionic acid, methyliminodiacetic acid, 2-methoxyethyliminodiacetic acid, nitrilotriacetic acid and ethylene diamine tetrapropionic acid. It is particularly preferred to use citric acid as the complex former.

Salts of these complex formers may of course also be used. Acids which are unstable under the polymerisation conditions, for example tartaric acid, are less suitable.

The complex former is generally used in a total concentration of from $10^{-5}$ to $10^{-2}$ mole/l. A concentration range of from $10^{-4}$ to $5\times10^{-3}$ mole/l is preferred.

In order to obtain a buffer effect, the complex former has to be used in excess in relation to the iron salt. Accordingly the molar ratio of iron salt to complex former is usually adjusted to a value in the range of from 1:1.5 to 1:1000. A molar ratio of from 1:5 to 1:100 is preferred.

The emulsifiers used for carrying out the process according to the invention are generally ionic emulsifiers which are active in acid medium, for example anion-active emulsifiers, such as sulphuric acid derivatives, sulphonic acids, phosphonic acid derivatives or phosphonic acids. Very good results are obtained with alkyl sulphonates containing from 10 to 18 carbon atoms in the alkyl chain, alkylaryl sulphonates containing from 8 to 14 carbon atoms in the alkyl chain, fatty alcohol sulphates and sulphosuccinic acid esters. Sodium lauryl sulphate is preferably used. The emulsifiers are generally used in concentrations of from 0.75 to 8% by weight, based on the total monomer. In addition to the ionic emulsifiers, non-ionic emulsifiers may be added to the polymerisation medium. Suitable non-ionic emulsifiers are polyglycol ethers obtained by the addition reaction of a relatively large number of ethylene oxide or propylene oxide molecules with fatty alcohols, alkyl phenols, aralkyl phenols, fatty acids, resinic acids or fatty acid amides. Examples are oleyl polyethylene glycol ether, coconut oil alcohol polyethylene glycol ether, i-nonyl phenol polyethylene glycol ether, oleic acid polyethylene glycol ether esters or abietic acid polyethylene glycol ether esters with ethoxylation degrees of from about 6 to 40.

Both in the case of the ionic emulsifiers and in the case of the non-ionic emulsifiers, it is also possible to used mixtures of different emulsifiers. If, for example, mixtures of anion-active and non-ionic emulsifiers are used, the total concentration of the emulsifiers usually amounts to between 0.75 and 8% by weight, based on the total monomer. In this case, the ratio by weight of anion-active to non-ionic emulsifier preferably amounts to between 10:1 and 1.5:1.

A latex of acrylonitrile-vinyl chloride copolymer in the form of a dilute aqueous emulsion may optionally be added to the polymerisation mixture before the beginning of polymerisation. Under these conditions, prolonged latent times are avoided at the beginning of polymerisation. A latex such as this is described in German Offenlegungsschrift No. 2,300,713.

Temperatures in the range of from 10° to 60° C. are suitable for carrying out the polymerisation process according to the invention. Relatively low temperatures of from 20° to 50° C. are particularly advantageous. At these temperatures, the decomposition of the peroxodisulphate or rather the reaction of peroxodisulphate with bisulphite takes place too slowly in the absence of heavy metal catalysts to make a sufficient quantity of starter radicals available so that only low polymerisation velocities are obtained. Even at these temperatures, however, the process according to the invention gives adequate polymerisation velocities.

In cases where mixtures of iron salts and complex formers are used as components of the catalysts system which initiates polymerisation of the monomers, copolymers are obtained of which the analytical data (Cl, N, ln $\eta_r/c$)—where the copolymerisation reaction is repeated several times—show a considerably reduced standard deviation by comparison with the analytical data of copolymers which have been obtained by repeatedly carrying out a copolymerisation reaction in the absence of the corresponding additives. In other words, in the process according to the invention the analytical data are scattered to a far lesser extent about their mean value.

Accordingly, as can be seen from the following Examples, the process according to the invention is far less susceptible to disturbances attributable to a fluctuating concentration of heavy metal ions in the polymerisation medium.

The process according to the invention gives latices which have only a limited tendency towards coagulate formation. Accordingly, the process provides for the production of latices having a polymer content of up to about 25% by weight without coagulation occurring. In this way, undesirable wall deposits and blockages of pipes, which complicate working up, are avoided.

The latices may be precipitated in the usual way, for example with acetone or with aqueous solutions of electrolytes, such as sodium chloride, sodium sulphate, calcium chloride, magnesium sulphate, zinc sulphate or aluminium sulphate.

The polymers obtained after working up are soluble, for example in acetone, acetonitrile, dimethyl formamide, dimethyl acetamide and dimethyl sulphoxide. Even in cases where the polymerisation reaction has been carried out in the presence of high concentrations of iron ions which normally impair the whiteness and thermal stability of the polymers, the products obtained by the process according to the invention, both in solid form and also in solution, show a high degree of whiteness and good thermal stability, coupled with only minimal elimination of hydrogen chloride, even at elevated temperatures.

The whiteness and colour stability of the polymers described in the Examples were determined by the following tests:

(Test a): The polymer powder was pressed and the standard colour values, X, Y, Z for standard light, type D 65/2°—normal observer, were determined from the pressings in accordance with DIN 5033. The colour differences $\Delta E_{AN}$ were calculated from the standard colour values in accordance with DIN 6174 against barium sulphate as standard.

(Test b): The polymer powders were dissolved to form 5% solutions in dimethyl formamide (DMF). The transmission curves of the solutions were measured in a 5 mm cuvette against dimethyl formamide and the standard colour values for standard light, type D 65/2°—normal observer, were calculated from the curves. The colour differences $\Delta E_{AN}$ were calculated from the standard colour values in accordance with DIN 6174 against the solvent as standard.

The polymers have solution viscosities in $\eta_r/C$ and K-values that are sufficiently high to guarantee good spinning behaviour. The solutions of the polymers show favourable viscosity behaviour. In other words, the viscosity of their solutions shows little change in the event of prolonged standing even at elevated temperature. The polymers may be spun by known wet or dry spinning processes to form filaments and fibres showing favourable textile properties, a good natural colour and excellent flameproof properties.

The process according to the invention is illustrated by the following Examples in which the parts and percentages guoted represent parts and percentages by weight.

The solution viscosities in $\eta_r/C$ of the polymers which are quoted in the Examples were determined on 0.5% solutions in dimethyl formamide at 25° C. The K-values were calculated in accordance with Fikentscher, Cellulosechemie 13 (1932), page 58.

EXAMPLE 1

(Comparison Test)

21,000 parts of deionised water, 150 parts of sodium disulphite, 200 parts of sodium lauryl sulphate, 0.052 part of iron(II)ammonium sulphate (0.133 mMole), 70 parts of 1 N sulphuric acid and 1200 parts of a latex of acrylonitrile-vinyl chloride copolymer with a solids content of 7% are introduced into a polymerisation autoclave. The oxygen is removed by passing nitrogen over, 420 parts of acrylonitrile and 7100 parts of vinyl chloride are introduced under pressure and a temperature of 30° C. is adjusted. The polymerisation reaction is started by the introduction under pressure of a solution of 10.5 parts of ammonium peroxodisulphate in 650 parts of deionised water. Immediately afterwards, 1400 parts of acrylonitrile and a solution of 21.0 parts of ammonium peroxodisulphate and 100 parts of 1 N sulphuric acid in 1300 parts of deionised water are uniformly pumped in over a period of 7 hours, a solids content of 14.0% by weight being obtained after 7 hours. The polymerization was carried out at a pH-value of 3.5. After stirring for 10 minutes, the excess vinyl chloride is distilled off and the latex obtained is run off from the autoclave. Following the addition of a solution of 100 parts of aluminum sulphate and 50 parts of 1 N sulphuric acid in 3000 parts of deionised water, the polymer is precipitated by the introduction of steam and heating to 95° C. Working up gives 3500 parts of polymer having a chlorine content of 32.6% by weight, a nitrogen content of 10.5% by weight (ratio by weight of AN:VC=40.9:59.1) and a 1 n $\eta_r$/C value of 0.89 (K-value 67). The whiteness tests produced the following results:
Powder: $\Delta E_{AN}=1.6$.
5% in DMF: $\Delta E_{AN}=2.2$.

EXAMPLES 2–12

(Comparison Tests)

Example 1 was repeated eleven times under exactly the same conditions. The results and analytical data set out in Table 1 are obtained. If polymer batches having a chlorine content of from 31.5 to 33.5% by weight are required for example for certain applications, 7 polymers are useable and 5 polymers unuseable.

100 parts of 1 N sulphuric acid and 4.2 parts of citric acid (20 mMole) in 1300 parts of deionised water are uniformly pumped in over a period of 7 hours, a solids content of the latex of 14.5% by weight being obtained after 7 hours. The pH-value was 3.4. After stirring for 10 minutes, the excess vinyl chloride is distilled off and the latex obtained is run off from the autoclave. Following the addition of a solution of 100 parts of aluminium sulphate and 50 parts of 1 N sulphuric acid in 3000 parts of deionised water, the polymer is precipitated by the introduction of steam and heating to 95° C. Working up gives 3600 parts of polymer having a chlorine content of 32.8% by weight, a nitrogen content of 10.35% by weight (ratio by weight of AN:VC=40.4:59.6) and a 1 n $\eta_r$/C-value of 0.88 (K-value 66.5).

The whiteness and colour stability tests produced the

TABLE 1

| Example No. | pH-value of the polymerization | Solids content (% by weight) | Cl (% by weight) | N (% by weight) | ln $\eta_r$/C (% by weight) | K-value |
|---|---|---|---|---|---|---|
| 1 | 3.5 | 14.0 | 32.6 | 10.5 | 0.89 | 67 |
| 2 | 3.5 | 13.0 | 31.7 | 11.3 | 1.00 | 71.3 |
| 3 | 3.3 | 15.5 | 34.2 | 10.1 | 0.86 | 65.5 |
| 4 | 3.7 | 13.2 | 31.8 | 10.65 | 0.98 | 70.8 |
| 5 | 3.6 | 14.0 | 31.5 | 11.05 | 0.97 | 70 |
| 6 | 3.9 | 12.5 | 31.35 | 11.25 | 0.97 | 70 |
| 7 | 3.6 | 14.8 | 33.45 | 10.35 | 0.83 | 64.5 |
| 8 | 3.5 | 14.0 | 32.0 | 10.95 | 0.87 | 66 |
| 9 | 3.8 | 12.8 | 31.35 | 11.4 | 0.92 | 68 |
| 10 | 3.4 | 15.2 | 34.5 | 9.9 | 0.83 | 64.5 |
| 11 | 3.7 | 13.8 | 31.8 | 10.8 | 0.91 | 67.5 |
| 12 | 3.3 | 14.5 | 33.9 | 10.25 | 0.86 | 65.5 |
| Mean value | | 13.94 | 32.51 | 10.71 | 0.907 | 67.5 |
| Standard deviation | | 0.95 | 1.18 | 0.50 | 0.060 | |

A statistical evaluation of Examples 1 to 12 reveals the following mean values and standard deviations:

| Solids content | 13.94 ± 0.95% by weight |
|---|---|
| Chlorine content | 32.51 ± 1.18% by weight |
| Nitrogen content | 10.71 ± 0.50% by weight |
| ln $\eta_r$/C | 0.907 ± 0.060. |

EXAMPLE 13

21,000 parts of deionised water, 150 parts of sodium disulphite, 200 parts of sodium lauryl sulphate, 0.52 part of iron(II)ammonium sulphate (1.33 mMole), 5.25 parts of citric acid (25 mMole), 70 parts of 1 N sulphuric acid and 1200 parts of a latex of acrylonitrile-vinyl chloride copolymer having a solids content of 7% are introduced into a polymerisation autoclave. The oxygen is removed by passing nitrogen over, 420 parts of acrylonitrile and 7100 parts of vinyl chloride are introduced under pressure, and a temperature of 30° C. is adjusted. The polymerisation reaction is started by the introduction under pressure of a solution of 10.5 parts of ammonium peroxodisulphate in 650 parts of deionised water. Immediately afterwards, 1400 parts of acrylonitrile and a solution of 21.0 parts of ammonium peroxodisulphate, following results:
Powder: $\Delta E_{AN}=1.2$.
5% in DMF: $\Delta E_{AN}=1.6$.

EXAMPLES 14–24

Example 13 is repeated eleven times under exactly the same conditions. The results and analytical data set out in Table 2 are obtained, demonstrating the good reproducibility of the polymerisation tests carried out with the mixture of iron salt and complex former. If polymer batches containing from 31.5 to 33.5% by weight of chlorine are required for example for certain applications, all the polymers obtained by the process according to the invention are useable in this case.

A statistical evaluation of Examples 13 to 24 reveals the following mean values and standard deviations:
Solids content: 14.06±0.66% by weight
Chlorine content: 32.55±0.39% by weight
Nitrogen content: 10.74±0.32% by weight
1 n $\eta_r$/C: 0.887±0.026% by weight.

For mean values which are comparable with the mean values of Examples 1 and 2, the analytical data show a considerably reduced standard deviation and are therefore indicative of the improved reproducibility and reduced susceptibility to disturbances of the polymerisation process according to the invention.

TABLE 2

| Example No. | pH-value | Solids (% by weight) | Cl (% by weight) | N (% by weight) | ln $\eta_r$/C | K-value |
|---|---|---|---|---|---|---|
| 13 | 3.4 | 14.5 | 32.8 | 10.35 | 0.88 | 66.5 |
| 14 | 3.7 | 13.5 | 32.6 | 10.9 | 0.89 | 67 |

TABLE 2-continued

| Example No. | pH-value | Solids (% by weight) | Cl (% by weight) | N (% by weight) | ln η_r/C | K-value |
|---|---|---|---|---|---|---|
| 15 | 3.4 | 13.2 | 32.1 | 10.55 | 0.87 | 66 |
| 16 | 3.4 | 14.5 | 33.0 | 10.85 | 0.85 | 65 |
| 17 | 3.4 | 14.5 | 32.8 | 10.75 | 0.92 | 68 |
| 18 | 3.4 | 14.0 | 32.25 | 10.65 | 0.90 | 67.3 |
| 19 | 3.5 | 13.0 | 32.1 | 11.0 | 0.94 | 69 |
| 20 | 3.3 | 14.0 | 32.45 | 10.25 | 0.86 | 65.5 |
| 21 | 3.8 | 13.5 | 32.3 | 11.15 | 0.91 | 67.5 |
| 22 | 3.7 | 15.0 | 33.1 | 11.25 | 0.87 | 66 |
| 23 | 3.3 | 14.0 | 33.05 | 10.35 | 0.87 | 66 |
| 24 | 3.4 | 15.0 | 32.05 | 10.8 | 0.89 | 67 |
| Mean value | | 14.06 | 32.55 | 10.74 | 0.887 | 66.7 |
| Standard deviation | | 0.66 | 0.39 | 0.32 | 0.026 | |

EXAMPLE 25

20,500 parts of deionised water, 150 parts of sodium disulphite, 200 parts of sodium lauryl sulphate, 0.52 part of iron(II)ammonium sulphate (1.33 mMole), 5.25 parts of citric acid (25 mMole), 80 parts of 1 N sulphuric acid and 1200 parts of a latex of acrylonitrile-vinyl chloride copolymer having a solids content of 6% are introduced into a polymerisation autoclave. The oxygen is removed by passing nitrogen over, 420 parts of acrylonitrile and 7100 parts of vinyl chloride are introduced under pressure, and the temperature is adjusted to 30° C. The polymerisation reaction is started by the introduction under pressure of a solution of 10.5 parts of ammonium peroxodisulphate in 700 parts of deionised water. Immediately afterwards, 3000 parts of acrylonitrile and a solution of 45 parts of ammonium peroxodisulphate and 220 parts of 1 N sulphuric acid in 2780 parts of deionised water are uniformly pumped in over a period of 15 hours, a solids content of 25.5% by weight being obtained after 15 hours. The polymerization was carried out at a pH-value of 3.6. After stirring for 10 minutes, the excess vinyl chloride is distilled off and the latex obtained is run off from the autoclave. Following the addition of a solution of 150 parts of aluminium sulphate and 75 parts of 1 N sulphuric acid in 6000 parts of deionised water, the polymer is precipitated by the introduction of steam and heating to 95° C. After filtration, washing and drying, 7500 parts of polymer are obtained with a chlorine content of 32.9% by weight, a nitrogen content of 10.64% by weight and a 1 n η_r/C-value of 0.88 (K-value 66.5).

The whiteness and colour stability tests produced the following results:
Powder: $\Delta E_{AN} = 1.3$.
5% in DMF: $\Delta E_{AN} = 1.4$

EXAMPLE 26

The procedure is as described in Example 13, except that 1.05 parts of citric acid are added to the mixture accommodated in the autoclave and 1.05 parts of citric acid are added to the solution subsequently introduced into the autoclave. The pH-value was 3.8. A latex having a solids content of 16% by weight is obtained after 7 hours, and working up gives 4050 parts of polymer having a chlorine content of 36.1% by weight, a nitrogen content of 9.65% by weight (ratio by weight of AN:VC=36.1:63.9) and a 1 n η_r/C-value of 0.74 (K-value 60.5)

EXAMPLE 27

The procedure is as described in Example 13, except that 0.26 parts of iron(II)ammonium sulphate (0.665 mMole) are introduced into the mixture accommodated in the autoclave. The pH-Value was 3.5. A latex with a solids content of 14% by weight is obtained after 7 hours, and working up gives 3440 parts of polymer having a chlorine content of 31.3% by weight, a nitrogen content of 11.5% by weight (ratio by weight of AN:VC=44.1:55.9) and a 1 n η_r/C-value of 0.93 (K-value 68.5).

EXAMPLES 28–30

In order to demonstrate the effectiveness of the iron buffer, Example 13 is repeated with the quantities of iron (II) ammonium sulphate indicated in Table 3. The pH-values were 3.4–3.5. The results, which are also shown in Table 3, indicate that the mixture of iron salt and complex former is capable of binding the increased quantity of iron so that it is unable significantly to change the analytical data.

EXAMPLES 31–33

(Comparison Examples)

Example 13 is repeated with the quantities of iron (II) ammonium sulphate indicated in Table 3, but without any citric acid added. The pH-values were 3.6–3.8. As the results set out in Table 3 show, the increased quantity of iron in this case significantly alters the analytical data in that the solids content and the chlorine content are increased whilst the nitrogen content and the K-value are greatly reduced. Accordingly, if quantities of iron such as these can be entrained without control in a process which does not correspond to the invention, polymerisation cannot be carried out with reproducible results.

TABLE 3

| Example No. | pH value | Fe(II)ammonium sulphate (parts) | Citric acid (parts) total | already present in the autoclave | subsequently added | Solids (% by weight) | Cl (% by weight) | N (% by weight) | ln η_r/C | K-value |
|---|---|---|---|---|---|---|---|---|---|---|
| 28 | 3.5 | 0.63 | 9.45 | 5.25 | 4.2 | 14.5 | 33.25 | 10.55 | 0.86 | 65.5 |

TABLE 3-continued

| Example No. | pH value | Fe(II)ammonium sulphate (parts) | Citric acid (parts) total | already present in the autoclave | subsequently added | Solids (% by weight) | Cl (% by weight) | N (% by weight) | ln η_r/C | K-value |
|---|---|---|---|---|---|---|---|---|---|---|
| 29 | 3.4 | 0.78 | " | " | " | 14.5 | 33.1 | 10.65 | 0.84 | 64.5 |
| 30 | 3.4 | 1.04 | " | " | " | 14.8 | 33.3 | 10.6 | 0.84 | 64.5 |
| 31 | 3.6 | 0.26 | — | — | — | 15.5 | 34.15 | 10.1 | 0.80 | 63 |
| 32 | 3.8 | 0.52 | — | — | — | 16.5 | 36.1 | 9.65 | 0.76 | 61 |
| 33 | 3.6 | 1.04 | — | — | — | 20.0 | 39.7 | 7.75 | 0.63 | 55 |

EXAMPLE 34

20,500 parts of deionised water, 150 parts of sodium disulphite, 200 parts of sodium lauryl sulphate, 0.52 part of iron(II)ammonium sulphate (1.33 mMole), 5.25 parts of citric acid (25 mMole), 70 parts of 1 N sulphuric acid and 1200 parts of a latex of acrylonitrilevinyl chloride copolymer having a solids content of 6% are introduced into a polymerisation autoclave. After nitrogen has been passed over, 420 parts of acrylonitrile and 7100 parts of vinyl chloride are introduced under pressure and the temperature is adjusted to 40° C. The polymerisation reaction is initiated by the introduction under pressure of a solution of 10.4 parts of ammonium peroxodisulphate in 700 parts of deionised water. The following components are then uniformly pumped in at a temperature of 40° C.:

| Solution 1: | sodium disulphite | 39 parts/hour |
| | sodium lauryl sulphate | 52 parts/hour |
| | iron(II)ammonium sulphate (0.345 mMole) | 0.135 part/hours |
| | deionised water | 2820 parts/hour |
| Solution 2: | ammonium peroxodisulphate | 5.45 parts/hour |
| | 1N sulphuric acid | 38 parts/hour |
| | citric acid (11.2 mMole) | 2.35 parts/hour |
| | deionised water | 2820 parts/hour |
| Solution 3: | acrylonitrile | 550 parts/hour |
| Solution 4: | vinyl chloride | 2000 parts/hour |

The pH-value was 3.3

The filling level of the autoclave is kept at 33 liters. 8327 parts/hour of latex (including unreacted vinyl chloride) are removed and the autoclave is vented with removal of the excess vinyl chloride by distillation. After a stationary operational condition has been adjusted, the respective latex samples removed and precipitated polymers show the following analytical data:

| Running time (h) | Solids (% by weight) | Cl-content (% by weight) | N-content (% by weight) | K-value |
|---|---|---|---|---|
| 15 | 14.5 | 29.75 | 11.65 | 77 |
| 17 | 14.5 | 30.05 | 11.1 | 77 |
| 19 | 15.0 | 29.95 | 11.85 | 77.5 |
| 21 | 15.0 | 30.2 | 11.35 | 77 |
| 23 | 15.0 | 30.05 | 11.97 | 76.5 |
| 25 | 14.5 | 29.7 | 12.3 | 75.5 |
| 27 | 14.5 | 29.8 | 12.1 | 75.5 |
| 31 | 14.2 | 29.6 | 12.2 | 75.5 |
| 35 | 14.3 | 29.5 | 11.7 | 75.5 |
| 39 | 14.8 | 29.2 | 12.0 | 77.5 |
| 43 | 15.0 | 29.1 | 12.2 | 77 |
| 47 | 15.0 | 29.05 | 12.2 | 78 |

For working up, the vented latex obtained after 8 hours in each case is collected. 250 parts of aluminum sulphate and 125 parts of 1 N sulphuric acid are added to it, followed by treatment with steam for 15 minutes at 95° C. for precipitation. The precipitated polymer is filtered off under suction, washed and dried. An average of 870 parts of polymer are obtained per hour.

EXAMPLE 35

Example 34 is continued at the same pH-value after a polymerisation time of 49 hours with a modified acrylonitrile input of 500 parts of acrylonitrile per hour, but with the same input of the other components. After about 10 hours, a new stationary operational condition is obtained. The following analytical data are determined:

| Running time (h) | Solids (% by weight) | Cl-content (% by weight) | N-content (% by weight) | K-value |
|---|---|---|---|---|
| 59 | 14.5 | 32.5 | 10.95 | 74 |
| 61 | 15.0 | 32.3 | 10.65 | 74.5 |
| 63 | 14.8 | 32.35 | 10.85 | 74 |
| 65 | 14.5 | 32.4 | 10.2 | 74 |
| 67 | 14.5 | 32.5 | 10.4 | 74 |
| 69 | 14.0 | 32.3 | 10.45 | 75 |
| 71 | 14.0 | 32.1 | 11.0 | 75.5 |
| 73 | 14.0 | 32.15 | 10.75 | 75 |
| 75 | 14.0 | 31.95 | 10.9 | 75 |
| 77 | 14.2 | 32.15 | 10.7 | 74 |

Working up is carried out in the same way as described in Example 34. An average of 860 parts of polymer/hour are obtained.

What we claim is:

1. In a semi-continuous or continuous process for the production of a chemically uniform acrylonitrile-vinyl chloride copolymer which contains from 30 to 60% by weight of acrylonitrile, from 70 to 40% by weight of vinyl chloride and, from 0 to 15% by weight of at least one other vinyl monomer, which process comprises polymerisation in aqueous emulsion in the presence of an nonionic or anionic emulsifier or mixture thereof in the presence of a redox catalyst of a peroxodisulphate and a water-soluble compound of tetravalent sulphur at a constant polymerisation velocity and with a fluctuating concentration of at least one iron salt in the reaction medium, the improvement wherein the polymerisation reaction is carried out at a pH-value of from 2 to 6 in the presence of a mixture of an iron salt and citric acid as a complex former.

2. The process of claim 1, wherein the polymerisation reaction is carried out within a pH-range of from 2.5 to 4.0.

3. The process of claim 1 wherein the emulsifier is present in an amount ranging from 0.75 to 8% by weight based on the total weight of the monomer.

4. The process as claimed in claim 1, wherein the polymerisation medium contains at least one iron salt in a total iron concentration of from $10^{-5}$ to $3\times10^{-4}$ mole/l.

5. The process of claim 1, wherein said complex former is present in a total concentration of from $10^{-5}$ to $10^{-2}$ mole/l.

6. The process of claim 1, wherein said complex former is present in a total concentration of from $10^{-4}$ to $5\times10^{-3}$ mole/l.

7. The process of claim 1, wherein the polymerisation medium contains at least one iron salt in a total iron concentration of from $10^{-6}$ to $5\times10^{-4}$ mole/l.

* * * * *

UNITED STATES PATENT AND TRADEMARK OFFICE
CERTIFICATE OF CORRECTION

PATENT NO. : 4,334,046
DATED : JUNE 8, 1982
INVENTOR(S) : JOACHIM KÖNIG et al

It is certified that error appears in the above—identified patent and that said Letters Patent is hereby corrected as shown below:

On the title page

Item [75] Add -- Walter Meckstroth, Marl, Fed. Rep. of Germany --.

Signed and Sealed this

Twenty-ninth Day of March 1983

[SEAL]

*Attest:*

GERALD J. MOSSINGHOFF

*Attesting Officer*     *Commissioner of Patents and Trademarks*